(12) United States Patent
Wurth et al.

(10) Patent No.: US 11,111,104 B2
(45) Date of Patent: Sep. 7, 2021

(54) ELEVATOR TRAVELING CABLE HANGER ASSEMBLY

(71) Applicant: Wurtec, Incorporated, Toledo, OH (US)

(72) Inventors: Steven P. Wurth, Sylvania, OH (US); Terry Rodebaugh, Whitehouse, OH (US); Frank Martinez, Rossford, OH (US)

(*) Notice: Subject to any disclaimer, the term of this patent is extended or adjusted under 35 U.S.C. 154(b) by 351 days.

(21) Appl. No.: 16/260,902

(22) Filed: Jan. 29, 2019

(65) Prior Publication Data
US 2019/0241403 A1 Aug. 8, 2019

Related U.S. Application Data

(60) Provisional application No. 62/627,344, filed on Feb. 7, 2018.

(51) Int. Cl.
| | |
|---|---|
| *B66B 7/08* | (2006.01) |
| *B66B 7/06* | (2006.01) |
| *F16L 3/12* | (2006.01) |
| *F16G 11/10* | (2006.01) |
| *F16G 11/14* | (2006.01) |

(52) U.S. Cl.
CPC ............. *B66B 7/08* (2013.01); *B66B 7/064* (2013.01); *F16G 11/105* (2013.01); *F16G 11/14* (2013.01); *F16L 3/1211* (2013.01)

(58) Field of Classification Search
CPC .......... B66B 7/064; B66B 7/085; B66B 7/08; H02G 3/32; F16G 11/105; F16G 11/14
See application file for complete search history.

(56) References Cited

U.S. PATENT DOCUMENTS

| | | | |
|---|---|---|---|
| 3,054,586 A | 9/1962 | Kirkup | |
| 3,295,832 A | 1/1967 | Fowler | |
| 3,430,733 A | 3/1969 | Smith | |
| 5,080,199 A | 1/1992 | McCallum, III | |
| 7,770,849 B2 | 8/2010 | Martin et al. | |
| 2009/0301822 A1 | 12/2009 | Keszthelyi | |
| 2010/0282937 A1* | 11/2010 | Schnoor | H02G 3/32 248/225.21 |
| 2011/0272547 A1* | 11/2011 | Gotou | B60R 16/0215 248/224.8 |

(Continued)

FOREIGN PATENT DOCUMENTS

| | | |
|---|---|---|
| EP | 3275824 A1 | 1/2018 |
| GB | 1559460 A | 1/1980 |
| WO | 2013104942 A1 | 7/2013 |

*Primary Examiner* — Diem M Tran
(74) *Attorney, Agent, or Firm* — Charles F. Charpie, III; Eastman & Smith LTD.

(57) ABSTRACT

An elevator traveling cable hanger assembly for use with an elevator is provided. The elevator traveling cable hanger assembly includes a base structure configured for attachment to an elevator hoistway structure. An insert is configured for attachment to the base structure and further configured to support an elevator traveling cable. A plurality of wire rope clips are configured to support a traveling cable core extending from the elevator traveling cable. A plurality of fasteners are configured to secure the base structure, insert, elevator traveling cable and plurality of wire rope clips to the elevator hoistway structure.

10 Claims, 7 Drawing Sheets

(56) References Cited

U.S. PATENT DOCUMENTS

| | | | |
|---|---|---|---|
| 2012/0097443 A1* | 4/2012 | Mazelle | F01D 25/00 |
| | | | 174/520 |
| 2012/0241260 A1* | 9/2012 | Harkonen | B66B 7/085 |
| | | | 187/414 |
| 2018/0309276 A1* | 10/2018 | Dietz | F16M 13/02 |

* cited by examiner

ELEVATOR TRAVELING CABLE HANGER ASSEMBLY

CROSS-REFERENCE TO RELATED APPLICATIONS

This application claims the benefit of U.S. Provisional Patent Application No. 62/627,344, filed Feb. 7, 2018, the disclosure of which is incorporated herein by reference in its entirety.

BACKGROUND

Elevators typically have one or more traveling cables. The traveling cable, also sometimes called a lighting or control cable, is a cable that incorporates transmission media for various functions including the non-limiting examples of supplying electricity to the elevator car and transmitting signals from the elevator car to a controller for the proper selection of floors.

An elevator traveling cable hanger can be used to attach one end of a traveling cable to the elevator car. Another elevator traveling cable hanger can be used to attach the opposing end of the traveling cable to a point in the elevator hoistway, near a junction box. A metal trough can be used as an electrical conduit between the junction box and the controller, which is typically disposed in a machine room located above the hoistway. In certain instances, it is known to attach the second elevator traveling cable hanger at the top of the hoistway.

It would be advantageous if elevator traveling cable hangers could be improved.

SUMMARY

It should be appreciated that this Summary is provided to introduce a selection of concepts in a simplified form, the concepts being further described below in the Detailed Description. This Summary is not intended to identify key features or essential features of this disclosure, not is it intended to limit the scope of the elevator traveling cable hanger assembly.

The above objects as well as other objects not specifically enumerated are achieved by an elevator traveling cable hanger assembly for use with an elevator. The elevator traveling cable hanger assembly includes a base structure configured for attachment to an elevator hoistway structure. An insert is configured for attachment to the base structure and further configured to support an elevator traveling cable. A plurality of wire rope clips are configured to support a traveling cable core extending from the elevator traveling cable. A plurality of fasteners are configured to secure the base structure, insert, elevator traveling cable and plurality of wire rope clips to the elevator hoistway structure.

The above objects as well as other objects not specifically enumerated are also achieved by an elevator traveling cable hanger assembly for use with an elevator. The elevator traveling cable hanger assembly includes a base structure configured for mounting to an elevator car. An insert is configured for attachment to the base structure and further configured to support an elevator traveling cable. A plurality of wire rope clips are configured to support a traveling cable core extending from the elevator traveling cable. A plurality of fasteners are configured to secure the base structure, insert, elevator traveling cable and plurality of wire rope clips to the elevator car in a manner such that the base structure, insert, elevator traveling cable and plurality of wire rope clips move as the elevator car moves within an elevator hoistway.

The above objects as well as other objects not specifically enumerated are also achieved by a method of using an elevator traveling cable hanger assembly with an elevator. The method includes the steps of mounting a base structure to an elevator hoistway structure or an elevator car, attaching an elevator traveling cable to an insert, mounting the insert and the elevator traveling cable to the base structure in a manner such as to support a traveling cable core extending from the elevator traveling cable and electrically connecting the elevator traveling cable to a junction box or the elevator car.

Various aspects of the elevator traveling cable hanger assembly will become apparent to those skilled in the art from the following detailed description of the illustrated embodiments, when read in light of the accompanying drawings.

DETAILED DESCRIPTION

The elevator traveling cable hanger assembly will now be described with occasional reference to specific embodiments. The elevator traveling cable hanger assembly may, however, be embodied in different forms and should not be construed as limited to the embodiments set forth herein. Rather, these embodiments are provided so that this disclosure will be thorough and complete, and will fully convey the scope of the elevator traveling cable hanger assembly to those skilled in the art.

Unless otherwise defined, all technical and scientific terms used herein have the same meaning as commonly understood by one of ordinary skill in the art to which the elevator traveling cable hanger assembly belongs. The terminology used in the description of the elevator traveling cable hanger assembly herein is for describing particular embodiments only and is not intended to be limiting of the elevator traveling cable hanger assembly. As used in the description of the elevator traveling cable hanger assembly and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the elevator traveling cable hanger assembly. Notwithstanding that the numerical ranges and parameters setting forth the broad scope of the elevator traveling cable hanger assembly are approximations, the numerical values set forth in the specific examples are reported as precisely as possible. Any numerical values, however, inherently contain certain errors necessarily resulting from error found in their respective measurements.

The description and figures disclose an elevator traveling cable hanger assembly (hereafter "hanger assembly") for use with an associated elevator traveling cable. Generally, in certain embodiments, the hanger assembly is configured to secure an end of a traveling cable to the elevator car. In other embodiments, the hanger assembly is configured to secure an opposing end of the traveling cable to a desired location within the elevator hoistway.

The term "traveling cable", as used herein, is defined to mean any structure used to convey electrical power and communication media between an elevator controller and the elevator car. The term "hanger assembly" as used herein, is defined to mean any structure, mechanism and/or device configured to support a traveling cable within an elevator hoistway.

Figure 1:
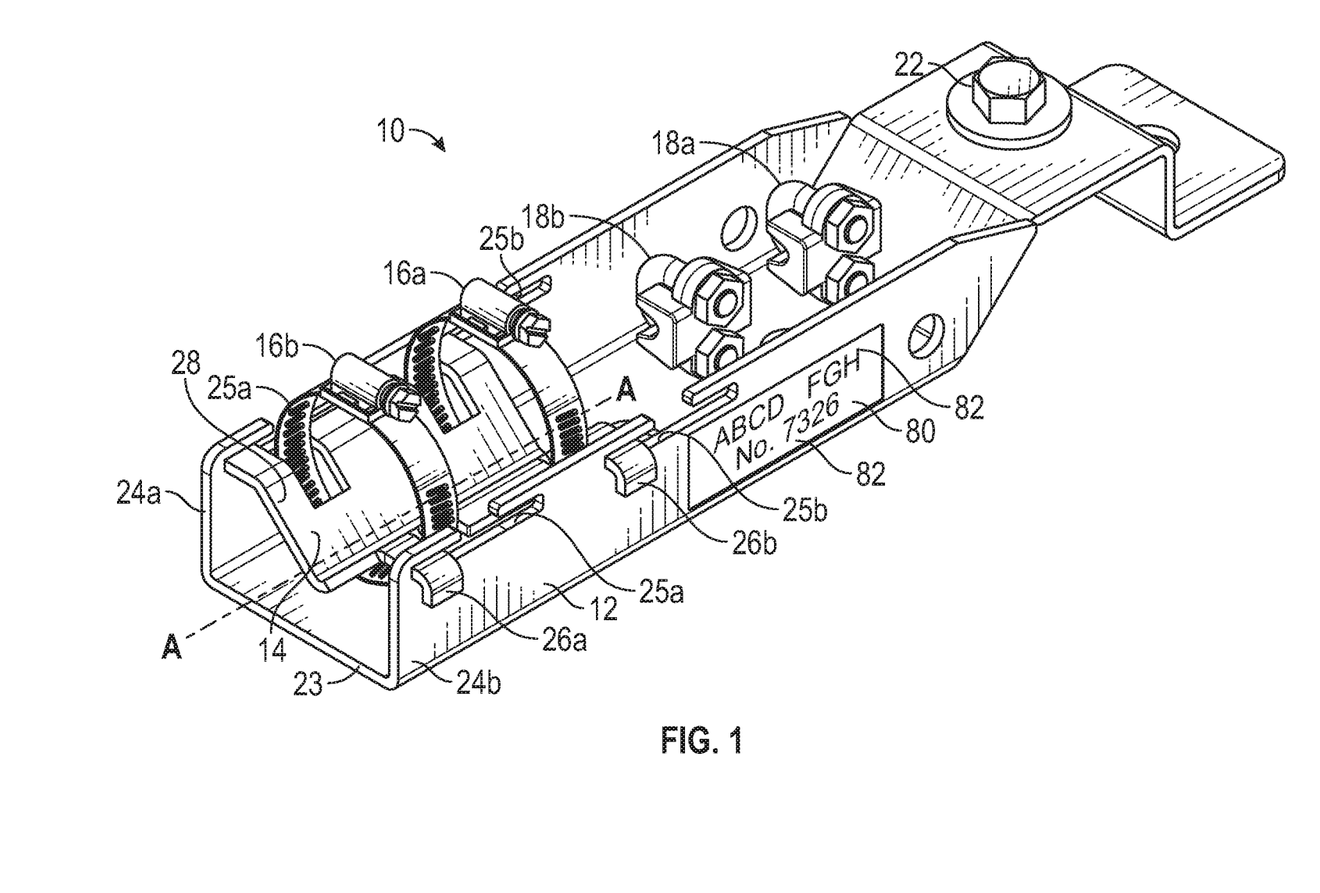
FIG. 1 is a perspective view of an elevator traveling cable hanger assembly in accordance with embodiments of the invention.

Referring now to FIG. 1, one embodiment of a hanger assembly is shown generally at 10. The hanger assembly 10 includes a base structure 12, an insert 14, a plurality of clamp members 16a, 16b, a plurality of wire rope clips 18a, 18b and a shoulder structure 22.

Referring again to FIG. 1, the base structure 12 includes a bottom segment 23 configured to support opposing sides 24a, 24b. Each of the opposing sides 24a, 24b includes a plurality of slots 25a, 25b. The slots 25a, 25b are configured to receive corresponding tabs 26a, 26b extending from opposing sides of the insert 14 such that the insert 14 is secured to the base structure 12. However, in alternate embodiments, it should be appreciated that the insert 14 can be secured to the base structure 12 with other structures, mechanisms and devices.

Referring again to FIG. 1, the insert 14 includes a mounting segment 28 having a longitudinal axis A-A. The mounting segment 28 is configured to receive a portion of a traveling cable (not shown), as will be described in more detail below. In the illustrated embodiment, the mounting segment 28 has a V-shaped cross-sectional profile along its length, sufficient to receive a portion of a traveling cable in a nested arrangement. Alternatively, the mounting segment 28 can have other cross-sectional profiles sufficient to receive a portion of a traveling cable in a nested arrangement.

Figure 2:
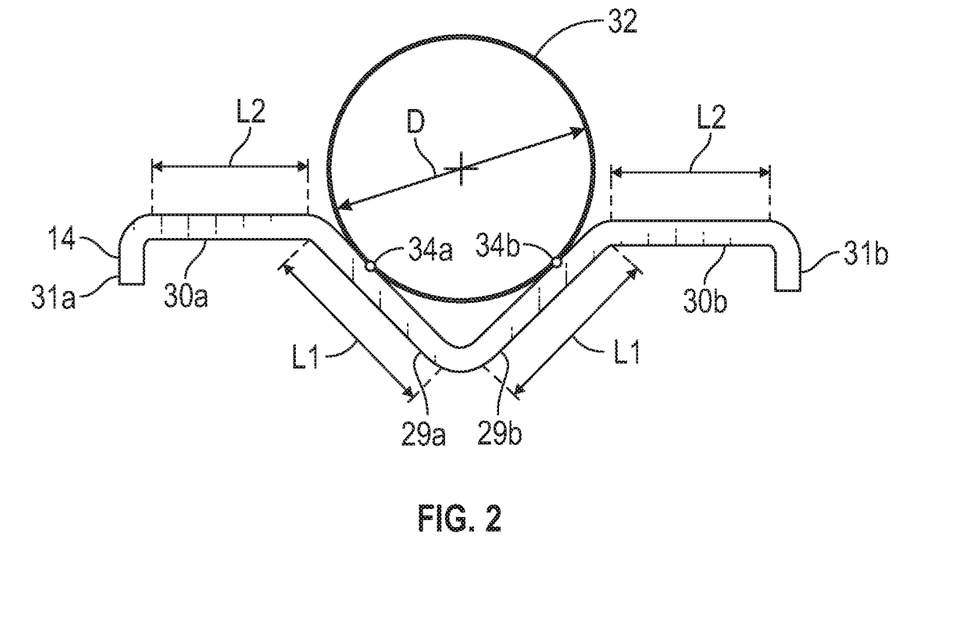
FIG. 2 is a front view of an insert of the elevator traveling cable hanger assembly of FIG. 1.

Referring now to FIG. 2, the insert 14 is shown in cross-section. The insert 14 includes the V-shaped profile of the mounting segment 28, formed by legs 29a, 29b. Each of the legs 29a, 29b has a length L1. Each of the legs 29a, 29b is connected to corresponding extension segments 30a, 30b. Each of the extension segments 30a, 30b has a length L2. Each of the extension segments 30a, 30b is connected to corresponding retention segments 31a-31b. In operation, the V-shaped profile of the mounting segment 28 is configured to receive and seat a traveling cable 32 such that an outer surface of the traveling cable 32 contacts the legs 29a, 29b along lines of contact 34a, 34b. To provide for a stable seating and retention of the traveling cable 32 within the V-shaped profile of the mounting segment 28, the lines of contact 34a, 34b are positioned within the lengths L1 of the legs 29a, 29b.

Referring now to FIGS. 1 and 2, the it is contemplated that the insert 14 can be configured for traveling cables having different diameters. In this scenario, the lengths L1 of the legs 29a, 29b and the lengths L2 of the extension segments 30a, 30b can be adjusted in a manner such that the outer surface of the traveling cable 32 contacts the legs 29a, 29b along lines of contact 34a, 34b, with the lines of contact 34a, 34b positioned within the lengths L1 of the legs 29a, 29b and further such that the insert 14 spans the base member 12 and the retention segments 31a, 31b can engage the slots 25a, 25b in the opposing sides 24a, 24b. In the illustrated embodiment, the traveling cable 32 has a diameter D in a range of from about 0.49 inches to about 1.65 inches. In other embodiments, the traveling cable 32 can have a diameter D less than about 0.49 inches or more than about 1.65 inches.

Figure 3:
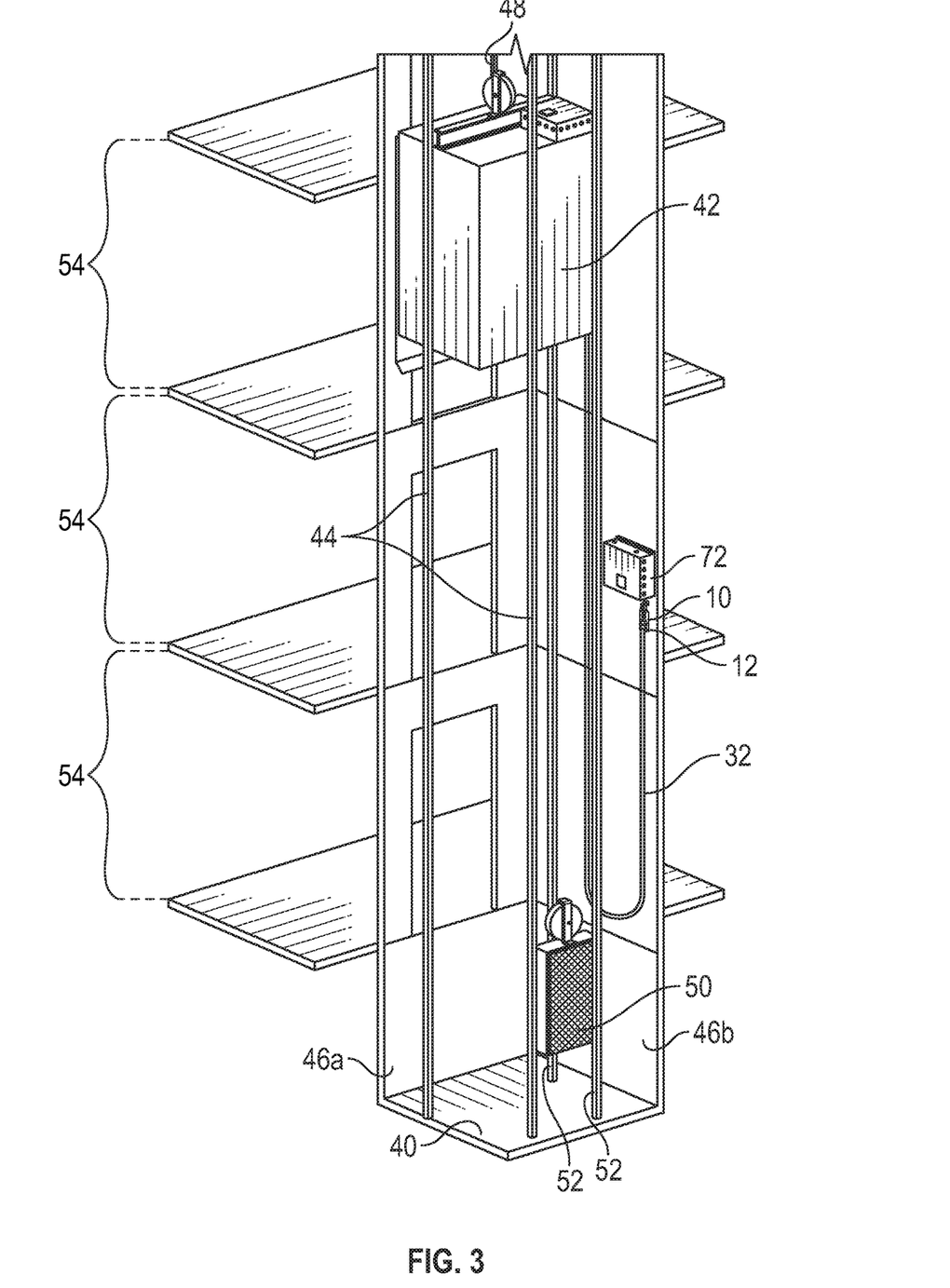
FIG. 3 is a schematic perspective view of an elevator hoistway illustrating the elevator traveling cable hanger assembly of FIG. 1 installed in an elevator hoistway.

As discussed above, the hanger assembly 10 is configured to secure an end of the traveling cable 32 to a desired location in an elevator hoistway. Referring now to FIG. 3, the hanger assembly 10 is shown in an installed position within an elevator hoistway 40. The hoistway 40 is conventional in the art and will only be briefly described herein. The hoistway 40 includes an elevator car 42 moving in a vertical direction on car guide rails 44. In the illustrated embodiment, the hoistway 40 is defined, in part, by cooperating hoistway walls 46a-46b. However, it should be appreciated that in other embodiments, the hoistway 40 can be defined by other structures, assemblies and components, such as the non-limiting example of structural divider beams and the like. The elevator car 42 is supported at one end of one or more suspension members 48, which are moved with an elevator machine (not shown). The other end of the one or more suspension members 48 is connected to a counterweight assembly 50. The counterweight assembly 50 is configured to balance a portion of the weight of the elevator car 42 and the rated capacity of the elevator car 42. The counterweight assembly 50 moves in a vertical direction on opposing counterweight guide rails 52. The hoistway 40 is divided vertically into a plurality of building floors 54.

Figure 4:
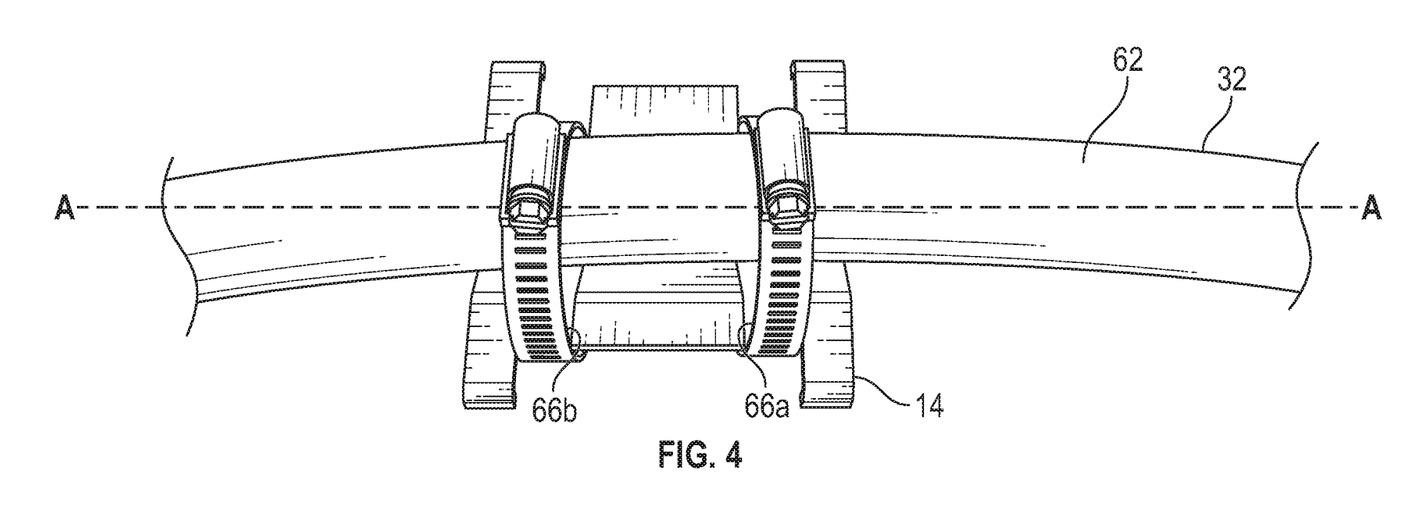
FIG. 4 is a perspective view of an elevator traveling cable attached to an insert of the elevator traveling cable hanger assembly of FIG. 1.

Referring now to FIGS. 1 and 3, installation of the hanger assembly 10 will be described. In an initial step, the base structure 12 is mounted to a suitable location in the hoistway 40 or to the elevator car 42 using a plurality of mounting apertures 60, located and spaced apart in the bottom segment 23 of the base structure 12, and suitable fasteners (not shown for purposes of clarity). Referring now to FIG. 4 in a next step, a portion of an outer cover 62 of the traveling cable 30 is removed from the traveling cable 32, thereby exposing a traveling cable core 64.

Referring again to FIG. 4, the plurality of clamp members 16a, 16b are disposed around the insert 14 and extend through spaced apart openings 66a, 66b in the insert 14. The clamp members 16a, 16b are arranged such that the traveling cable 32 can be inserted through the clamp members 16a, 16b. The traveling cable 32 is seated in the V-shaped cross-sectional shape of the mounting segment 28 of the insert 14 in a manner such that the insert 14 and the traveling cable 30 share the longitudinal axis A-A. Next, the clamp members 16a, 16b are tightened such that the traveling cable 32 is secured to the insert 14. In the illustrated embodiment, the clamp members 16a, 16b have the form of hose clamps.

However, in other embodiments, the clamp members 16a, 16b can be other structures, mechanisms and devices sufficient to secure the traveling cable 32 to the insert 14.

Figure 5:
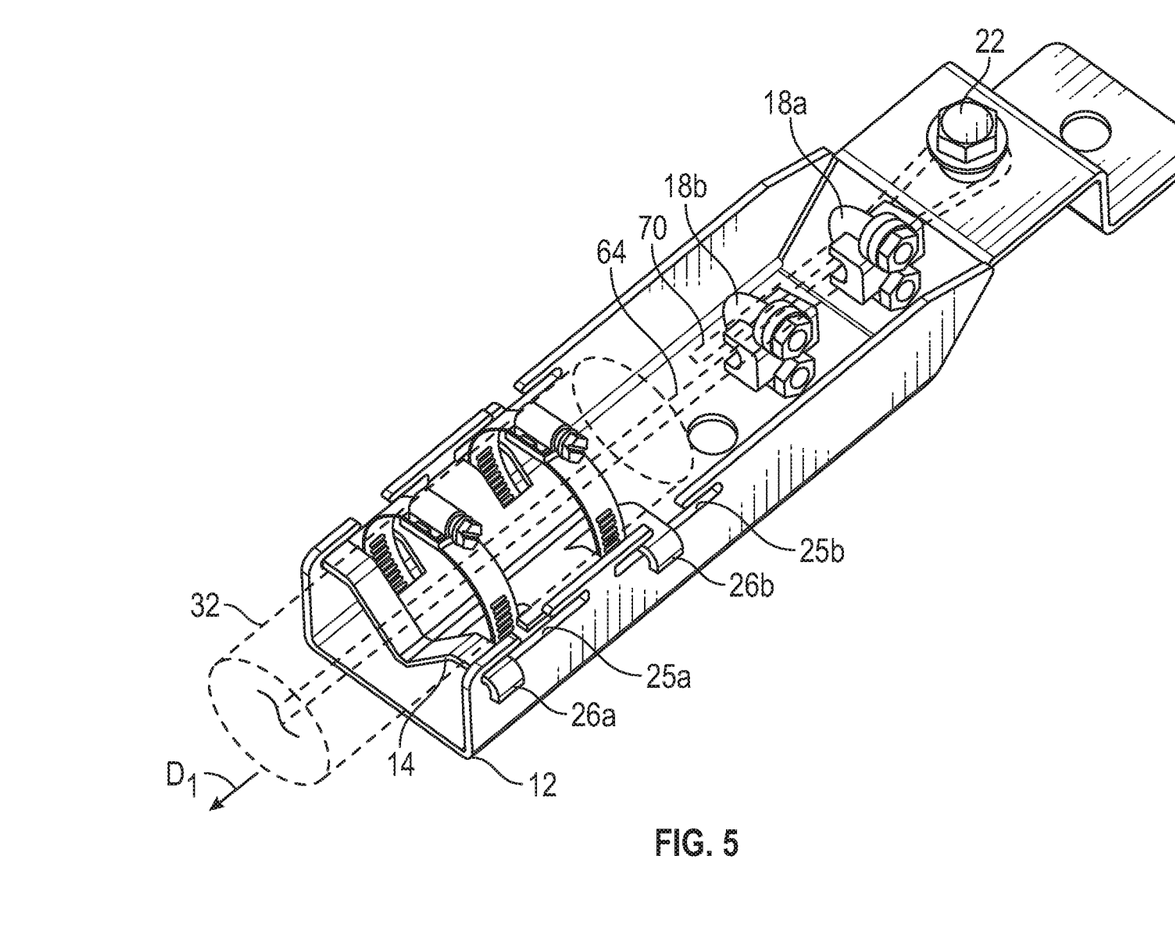
FIG. 5 is a perspective view of the assembly of FIG. 4 shown installed in a base structure of the elevator traveling cable hanger assembly of FIG. 1.

Referring now to FIG. 5 in a next step, the insert 14, with the attached traveling cable 32 (shown in phantom lines), is connected to the base structure 12 as the tabs 26a, 26b of the insert 14 are inserted into the slots 25a, 25b of the opposing sides 24a, 24b. Next, the weight of the traveling cable 32 is allowed to pull the insert 14 in a downward position, as shown by direction arrow D1, in a manner such that the tabs 26a, 26b seat in the corresponding slots 25a, 25b. In this manner, the insert 14 is secured to the base structure 12.

Referring again to FIG. 5 in a next step, an end portion 70 of the traveling cable core 64 is inserted through the wire rope clips 18a, 18b and is looped around the shoulder structure 22. In a next step, the end portion 70 of the traveling cable core 64 is again inserted through the wire rope clips 18a, 18b. Finally, the wire rope clips 18a, 18b are tightened, thereby securing the traveling cable core 64 to the base structure 12.

Referring again to FIG. 3, in an installed position the traveling cable 32 is supported by the hanger assembly 10 and extends from a conventional junction box 72 to the elevator car 62 in a looped arrangement.

Figure 6:
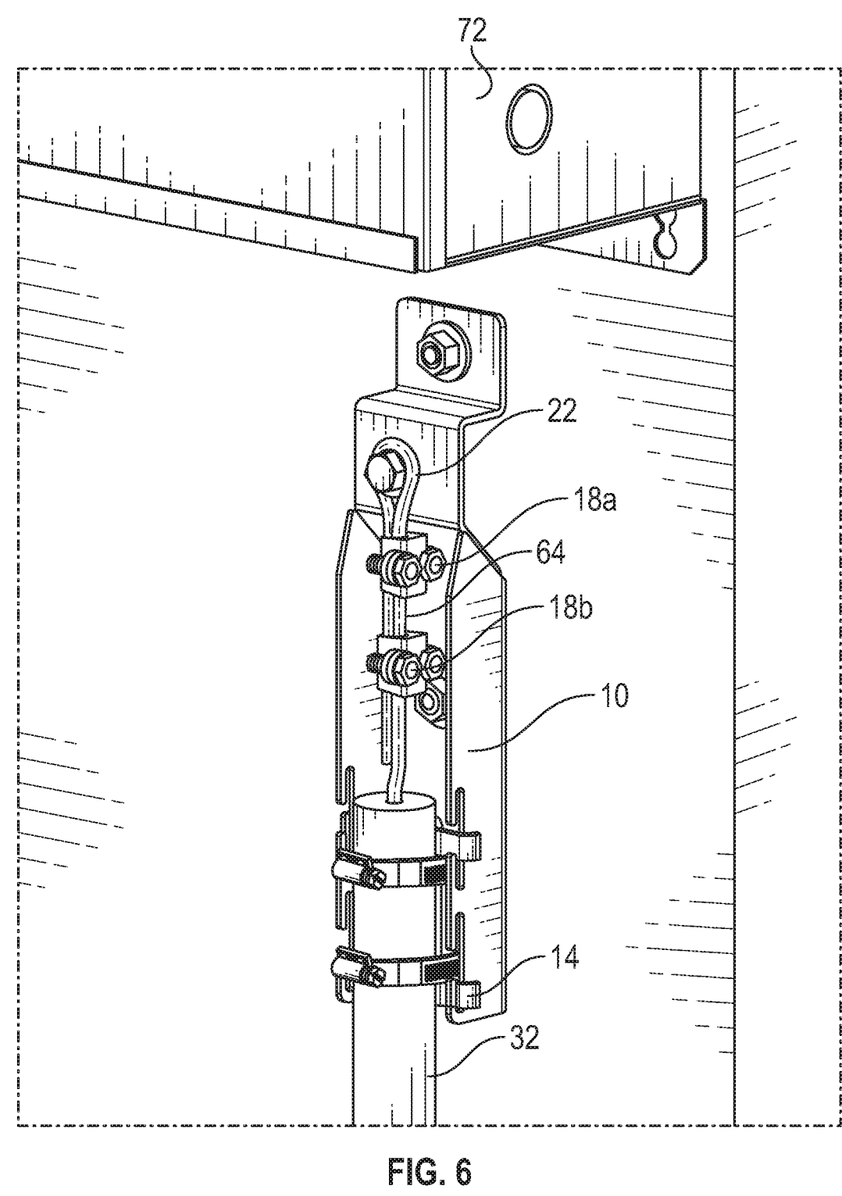
FIG. 6 is an perspective view of the hoistway of FIG. 3 illustrating an installed elevator traveling cable hanger assembly of FIG. 5.

Referring now to FIG. 6, the installed hanger assembly 10 and traveling cable 32, installed in the hoistway 40, are shown in greater detail. The traveling cable 32 is in electrical communication with the junction box 72 via a plurality of electrical connectors (not shown for purposes of clarity). As described above, in the installed position the traveling cable 32 is secured to the mounting segment 28 of the insert 14 and the insert 14 is retained by the plurality of slots 25a, 25b. Further in the installed position, the traveling cable core 64 is wrapped around the shoulder structure 22 and secured by the plurality of wire rope clips 18a, 18b. In this manner, the weight of the traveling cable 32 is supported by the plurality of wire rope clips 18a, 18b through the traveling cable core 64.

Figure 7:
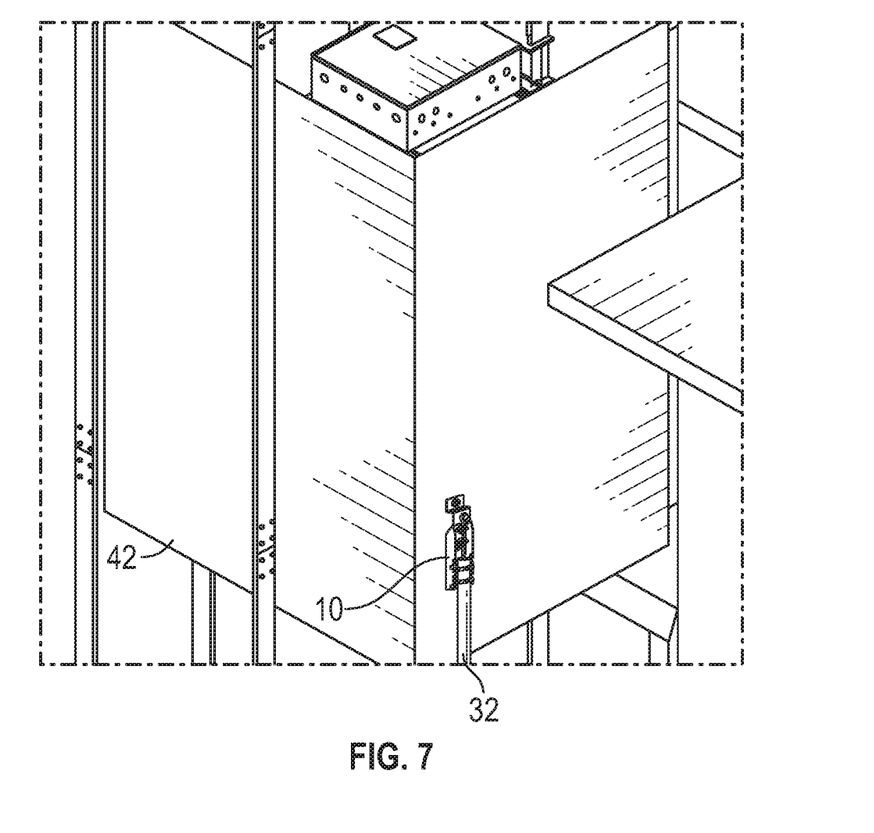
FIG. 7 is a perspective view of the elevator traveling cable hanger assembly of FIG. 5 shown in an installed arrangement on an elevator car.

As discussed above, the hanger assembly 10 can be used to secure an end of the traveling cable 32 to the elevator car 62. Referring now to FIG. 7, the hanger assembly 10 is shown in an installed position on an elevator car 42. In this position, the hanger assembly 10 supports the traveling cable 32 as the traveling cable 32 electrically connects to elements within the elevator car 42.

Referring again to FIG. 1, optionally, the base structure 12 can include signage 80. The signage 80 can include a plurality of images 82. Non-limiting examples of images 82 include use instructions, safety messages, warnings, patent number, company information and the like. The signage 80 can be disposed on the base structure 12 by various methods including printing, stickers, labels, placards or by any other desired structure and/or method.

In accordance with the provisions of the patent statutes, the principle and mode of operation of the elevator traveling cable hanger assembly have been explained and illustrated in certain embodiments. However, it must be understood that the elevator traveling cable hanger assembly may be practiced otherwise than as specifically explained and illustrated without departing from its spirit or scope.

What is claimed is:

1. An elevator traveling cable hanger assembly for use with an elevator, the elevator traveling cable hanger assembly comprising:
a base structure configured for attachment to an elevator hoistway structure;
an insert configured for attachment to the base structure and further configured to support an elevator traveling cable;
a plurality of wire rope clips configured to support a traveling cable core extending from the elevator traveling cable; and
a plurality of fasteners configured to secure the base structure, insert, elevator traveling cable and plurality of wire rope clips to the elevator hoistway structure;
wherein the elevator traveling cable forms a plurality of lines of contact with a V-shaped mounting segment when installed in the insert, and the plurality of lines of contact are within a length of a plurality of legs forming the V-shaped mounting segment.

2. The elevator traveling cable hanger assembly of claim 1, wherein the elevator hoistway structure is a hoistway wall.

3. The elevator traveling cable hanger assembly of claim 1, wherein the elevator traveling cable is secured to the V-shaped mounting segment with a plurality of hose clamps.

4. The elevator traveling cable hanger assembly of claim 1, wherein the insert is slidably engaged with slots in the base structure.

5. The elevator traveling cable hanger assembly of claim 1, wherein the traveling cable core is further supported by a support structure attached to the base structure.

6. An elevator traveling cable hanger assembly for use with an elevator, the elevator traveling cable hanger assembly comprising:
a base structure configured for mounting to an elevator car;
an insert configured for attachment to the base structure and further configured to support an elevator traveling cable;
a plurality of wire rope clips configured to support a traveling cable core extending from the elevator traveling cable; and
a plurality of fasteners configured to secure the base structure, insert, elevator traveling cable and plurality of wire rope clips to the elevator car in a manner such that the base structure, insert, elevator traveling cable and plurality of wire rope clips move as the elevator car moves within an elevator hoistway;
wherein the elevator traveling cable forms a plurality of lines of contact with a V-shaped mounting segment when installed in the insert, and the plurality of lines of contact are within a length of a plurality of legs forming the V-shaped mounting segment.

7. The elevator traveling cable hanger assembly of claim 6, wherein the base structure is mounted to an outside surface of the elevator car.

8. The elevator traveling cable hanger assembly of claim 6, wherein the elevator traveling cable is secured to the V-shaped mounting segment with a plurality of hose clamps.

9. The elevator traveling cable hanger assembly of claim 6, wherein the insert is slidably engaged with slots in the base structure.

10. The elevator traveling cable hanger assembly of claim 6, wherein the traveling cable core is further supported by a support structure attached to the base structure.

* * * * *